United States Patent [19]

Padget

[11] 4,080,495
[45] Mar. 21, 1978

[54] CHLORINATION PROCESS

[75] Inventor: John Christopher Padget, Runcorn, England

[73] Assignee: Imperial Chemical Industries Limited, London, England

[21] Appl. No.: 718,630

[22] Filed: Aug. 30, 1976

[30] Foreign Application Priority Data

Sep. 19, 1975 United Kingdom ............... 38553/75

[51] Int. Cl.$^2$ ........................... C08F 6/10; C08C 2/06
[52] U.S. Cl. .................................... 528/491; 260/4 R; 260/5; 260/772; 260/816 R; 260/887; 260/889; 260/890; 260/894; 526/43; 528/498
[58] Field of Search .................. 260/772, 816, 4 R, 5, 260/887, 889, 890, 894; 526/43; 528/498, 491

[56] References Cited

U.S. PATENT DOCUMENTS 2,334,277  11/1943  Morrell et al. ....................... 260/772

Primary Examiner—Stanford M. Levin
Attorney, Agent, or Firm—Cushman, Darby & Cushman

[57] ABSTRACT

In the preparation of chlorinated polymers by chlorination in an organic solvent and separation of the solid product by treatment with steam or hot water the proportion of residual solvent in the product is reduced by carrying out the treatment with steam or hot water in the presence of a polymer derived from an olefinic hydrocarbon or chlorohydrocarbon and having a second-order transition temperature below 0° C.

15 Claims, No Drawings

CHLORINATION PROCESS

This invention relates to a chlorination process and more particularly to the production of chlorinated polymers.

A process commonly employed for the chlorination of aliphatic hydrocarbon polymers or copolymers (for example natural rubber, polybutadiene, polyisoprene, polyethylene, polypropylene and ethylene/propylene copolymers) comprises introducing gaseous chlorine into a solution of the polymer or copolymer in a chlorine-resistant organic solvent at an elevated temperature (for example at a temperature in the range 60° C to 120° C).

The chlorine-resistant solvents commonly employed in this process are chlorinated hydrocarbons, and include not only those solvents which are inert towards chlorine but also others which may react to some degree with chlorine under the conditions employed but, in so reacting, are converted to chlorinated solvents which are substantially inert towards chlorine. Examples include carbon tetrachloride, chloroform, methylene chloride, trichloroethylene, tetrachloroethane and mixtures thereof.

The chlorinated polymer produced may conveniently be isolated in solid form by treatment of the reaction mixture with steam or hot water, thereby distilling off most of the organic solvent employed in the chlorination reaction.

The solid chlorinated polymers thus obtained may be dried by conventional means but, even after the drying stage, often retain an appreciable proportion of the organic solvent in the product (for example up to 10 parts by weight of organic solvent per hundred parts by weight of the chlorinated polymer). The residual organic solvent is difficult to remove by further drying or direct distillation, but vapours of the organic solvent retained in the product may in some circumstances be evolved during subsequent use of the chlorinated polymer, for example during the formulation or use of a paint containing the chlorinated polymer. Such evolution of the organic solvent is generally undesirable, for example in view of the toxicity of the solvents commonly employed in the chlorination process.

It has been proposed (German OLS No. 2 359 461) to reduce the proportion of organic solvent in the final product by adding to the chlorination solution, before steam distillation, 2 to 14% by weight (based on the chlorinated polymer) of a conventional plasticiser and/or a lacquer resin.

The presence of appreciable proportions of these additives may, however, be undesirable or unacceptable in particular formulations and commercial applications of the chlorinated polymers.

According to the present invention there is provided a process for the preparation of a chlorinated derivative of an aliphatic hydrocarbon polymer or copolymer by chlorination of the said polymer or copolymer in a chlorine-resistant organic solvent at elevated temperature and treatment of the solution thus obtained with steam or hot water, thereby separating in solid form the chlorinated polymer product, the treatment with steam or hot water being carried out in the presence of at least 0.5% by weight (based on the weight of the chlorinated polymer or copolymer) of a polymer or copolymer derived from an olefin hydrocarbon or chlorohydrocarbon and having a second-order transition temperature below 0° C.

The polymer or copolymer added is preferably derived from one or more of the following olefinic hydrocarbons and chlorohydrocarbons as monomer(s):

(i) butadiene
(ii) mono-olefins having from 2 to 4 carbon atoms
(iii) chloro-olefins or chloro-diolefins.

It is preferred that the added polymer or copolymer is liquid or elastomeric. It is also preferred that the added polymer or copolymer should have a second-order transition temperature below minus 10° C; it is especially preferred that the second-order transition temperature should be below minus 40° C.

Suitable materials which may be used as the added polymer include polybutadiene, polyisoprene, polyethylene, polyisobutylene, atactic polypropylene and polychloroprene.

When a copolymer is employed as the additive, this may be derived by copolymerisation of the olefinic hydrocarbon and/or chlorohydrocarbon with a wide range of comonomers provided that the resultant copolymer has the required second-order transition temperature of below 0° C.

The proportion of polymer or copolymer added may be, for example, in the range 0.5 to 10 parts (for example in the range 1 to 5 parts) per hundred parts of chlorinated polymer or copolymer, by weight. Higher proportions may, however, be used of desired (for example up to 20 parts per hundred parts of the chlorinated polymer or copolymer, by weight), the upper limit being set in practice by such factors as the compatibility of the added polymer or copolymer with the chlorinated polymer or copolymer and the proportion of added polymer or copolymer which is acceptable for the particular formulation or commercial application in which the chlorinated polymer or copolymer is used.

In general, for a given additive the higher the molecular weight of the additive the greater the proportion of the additive which will be required to achieve a given degree of reduction of the level of residual solvent. In some cases the proportion of additive may be more than 20 parts by weight (for example up to 50 parts by weight) per hundred parts by weight of the chlorinated polymer or copolymer.

The added polymer or copolymer may be added prior to or during (most conveniently prior to) the treatment with steam or hot water.

The polymers or copolymers which may be used as starting materials in the chlorination process include those mentioned hereinbefore in relation to the known process, for example natural rubber, polybutadiene, polyisoprene, polyethylene, polypropylene, ethylene/propylene copolymers, and mixtures thereof. Similarly, suitable chlorine-resistant organic solvents, suitable conditions and techniques for the chlorination and suitable methods for isolation of the solid chlorinated polymers or copolymers may be any of those known in the art. Details of suitable chlorine resistant solvents, in particular, are mentioned above.

The invention is illustrated by the following Examples in which all parts and percentages are by weight unless otherwise stated.

EXAMPLE 1

A solution was prepared of 89.5 grams of degraded cis 1,4-polyisoprene in 1000 grams of carbon tetrachloride. Gaseous chlorine was passed into this solution at 68° C until the chlorine content of the polymer was 66% by weight. Excess chlorine was removed from the solution by purging with nitrogen.

A portion of this solution, containing 100 grams of chlorinated polyisoprene in 380 grams of carbon tetrachloride, was taken and 10 grams of liquid polybutadiene (number average molecular weight = 800; containing 47% trans 1,4, 15% cis 1,4 and 38% vinyl unsaturation, and having a second order transition temperature of approximately minus 88° C) was added to it, followed by stirring at 68° C for 1 hours to effect dissolution of the polybutadiene.

The chlorinated polyisoprene was then precipitated by injection of the solution into hot water (95° C), and the precipitated polymer was dried at 70° C for 48 hours in an oven providing a through flow of air. The carbon tetrachloride content of the dried chlorinated polyisoprene was 0.9% by weight.

For purposes of comparison the same procedure was followed excpet that there was no addition of the polybutadiene. The carbon tetrachloride content of the dried chlorinated polyisoprene was 6.9% by weight.

EXAMPLE 2

The procedure of Example 1 was repeated except that the amount of polybutadiene added to the solution before precipitation was 7 grams.

The carbon tetrachloride content of the dried chlorinated polyisoprene was 2.1% by weight.

EXAMPLE 3

The procedure of Example 1 was repeated except that the amount of polybutadiene added to the solution before precipitation was 5 grams.

The carbon tetrachloride content of the dried chlorinated polyisoprene was 2.9% by weight.

EXAMPLE 4

The procedure of Example 1 was repeated except that, instead of polybutadiene, 10 grams of chloroprene rubber ("Neoprene" AC) having a second-order transition temperature of approximately minus 45° C were added to the solution before precipitation.

The carbon tetrachloride content of the dried chlorinated polyisoprene was 1.5% by weight.

EXAMPLE 5

The procedure of Example 1 was repeated except that, instead of polybutadiene, 10 grams atactic polypropylene ("Vistolan" granules) having a second-order transition temperature of minus 20° C were added to the solution before precipitation.

The carbon tetrachloride content of the dried chlorinated polyisoprene was 4.0% by weight.

EXAMPLE 6

A solution was prepared of 85.5 grams of degraded cis 1,4-polyisoprene in 1000 grams of carbon tetrachloride. Gaseous chlorine was passed into this solution at 68° C until the chlorine content of the polymer was 66% by weight. Excess chlorine was removed from the solution by purging with nitrogen.

A portion of this solution, containing 100 grams of chlorinated polyisoprene in 380 grams of carbon tetrachloride, was taken and 10 grams of degraded cis 1,4 polyisoprene (number average molecular weight = 5,000) having a second-order transition temperature of minus 70° C were added, followed by stirring at 68° C for 1 hour.

The chlorinated polyisoprene was then precipitated by injection of the solution into hot water (95° C) and the precipitated polymer was dried at 93° C for 24 hours in an oven providing a through flow of air. The carbon tetrachloride content of the dried chlorinated polyisoprene was 2.1% by weight.

By way of comparison the same procedure was followed except that there was no addition of polyisoprene prior to precipitation of the product. The carbon tetrachloride content of the dried product was 5.2% by weight.

EXAMPLE 7

The procedure of Example 6 was repeated except that the material added prior to precipitation was 10 grams of undergraded cis 1,4-polyisoprene (number average molecular weight 250,000) having a second-order transition temperature of minus 70° C.

The carbon tetrachloride content of the dried chlorinated polyisoprene was 2.7% by weight.

EXAMPLE 8

The procedure of Example 6 was repeated except that the material added prior to precipitation was 10 grams of a styrene/butadiene copolymer (25% by weight styrene) having a second-order transition temperature of minus 45° C.

The carbon tetrachloride content of the dried chlorinated polyisoprene was 2.7% by weight.

EXAMPLE 9

A solution was prepared of 85.5 grams of natural rubber in 1000 grams of carbon tetrachloride gaseous chlorine was passed into this solution at 68° C until the chlorine content of the polymer was approximately 66% by weight. Excess chlorine was removed from the solution by purging with nitrogen.

A portion of this solution, containing 100 grams of the chlorinated rubber in 380 grams of carbon tetrachloride, was taken and 10 grams of isoprene rubber ("Neoprene AD") having a second-order transition temperature of approximately minus 45° C were added, followed by stirring at 68° C for 1 hour.

The chlorinated rubber was then precipitated by injection of the solution into hot water (95° C) and the precipitated product was dried at 60° C for 48 hours. The carbon tetrachloride content of the dried chlorinated rubber was 2.2% by weight.

By way of comparison the same procedure was followed except that there was no addition of chloroprene rubber prior to precipitation of the product. The carbon tetrachloride content of the dried product was 8.1% by weight.

EXAMPLES 10 TO 13

The procedure of Example 9 was repeated except that different polymers were used as starting material for the chlorination in each case. The following Table shows the carbon tetrachloride content of the dried chlorinated polymer in each case (a) when 10 grams of the chloroprene rubber were added prior to precipitation and (b) by way of comparison when there was no addition prior to precipitation.

| Example | Polymer used as starting material for chlorination | Carbon tetrachloride content of dried chlorinated polymer (% by weight) | |
|---|---|---|---|
| | | (a) with addition of chloroprene rubber | (b) without addition |
| 10 | polyethylene | 1.8 | 6.4 |
| 11 | polyisoprene (50% by weight)/polybutadiene (50% by weight) | 3.1 | 8.6 |
| 12 | polypropylene | 3.8 | 9.3 |
| 13 | polybutadiene | 2.8 | 7.1 |

What is claimed is:

1. In a process for the preparation of a chlorinated derivative of an aliphatic hydrocarbon polymer or copolymer by chlorination of the said polymer or copolymer in a chlorine-resistant organic solvent at elevated temperature and treatment of the solution thus obtained with steam or hot water, thereby separating in solid form the chlorinated polymer or copolymer product, the improvement which comprises adding, subsequently to the chlorination of the said aliphatic hydrocarbon polymer or copolymer, at least 0.5% by weight (based on the chlorinated polymer or copolymer) of a polymer or copolymer derived from an olefinic hydrocarbon or chlorohydrocarbon and having a second-order transition temperature below 0° C.

2. A process according to claim 1 wherein the added polymer or copolymer has a second-order transition temperature below minus 10° C.

3. A process according to claim 2 wherein the added polymer has a second-order transition temperature below minus 40° C.

4. A process according to claim 1 wherein the added polymer or copolymer is liquid or elastomeric.

5. A process according to claim 1 wherein the added polymer or copolymer is derived from butadiene as monomer.

6. A process according to claim 1 wherein the added polymer or copolymer is derived from a mono-olefin having from 2 to 4 carbon atoms as monomer.

7. A process according to claim 6 wherein the added polymer is selected from the group consisting of polyisobutylene, polyethylene and atactic polypropylene.

8. A process according to claim 1 wherein the added polymer or copolymer is derived from a chloro-olefin or chloro-diolefin.

9. A process according to claim 8 wherein the added polymer is polychloroprene.

10. A process according to claim 1 wherein the added polymer is polyisoprene.

11. A process according to claim 1 wherein the proportion of polymer or copolymer added is from 0.5 to 20 parts by weight per hundred parts by weight of the chlorinated polymer or copolymer.

12. A process according to claim 1 wherein the added polymer or copolymer is added prior to the treatment with steam or hot water.

13. A process according to claim 1 wherein the starting material in the chlorination process is polyisoprene.

14. A process according to claim 1 wherein the starting material in the chlorination process is selected from the group consisting of natural rubber, polybutadiene polyethylene and polypropylene.

15. A process according to claim 1 wherein the solvent employed in the chlorination process is carbon tetrachloride.

* * * * *